United States Patent
Yamamoto et al.

(10) Patent No.: US 6,921,428 B2
(45) Date of Patent: Jul. 26, 2005

(54) DEVICE AND METHOD FOR SEPARATING AND COLLECTING HALIDE GAS

(75) Inventors: Osamu Yamamoto, Kyoto (JP); Masayuki Kinouchi, Ube (JP); Naoki Takada, Ube (JP); Yoji Kase, Ichihara (JP); Masao Kikuchi, Ichihara (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 10/466,188

(22) PCT Filed: Jan. 23, 2002

(86) PCT No.: PCT/JP02/00470

§ 371 (c)(1),
(2), (4) Date: Jul. 14, 2003

(87) PCT Pub. No.: WO02/058826

PCT Pub. Date: Aug. 1, 2002

(65) Prior Publication Data

US 2004/0045432 A1 Mar. 11, 2004

(30) Foreign Application Priority Data

| Jan. 25, 2001 | (JP) | 2001-016571 |
| Dec. 26, 2001 | (JP) | 2001-393642 |
| Jan. 18, 2002 | (JP) | 2002-010262 |

(51) Int. Cl.[7] .................... B01D 53/22; B01D 69/08; B01D 71/64
(52) U.S. Cl. .................... 95/45; 95/47; 96/8; 96/9; 96/10; 96/14
(58) Field of Search ............ 95/45, 47; 96/4, 96/7–10, 14

(56) References Cited

U.S. PATENT DOCUMENTS

| 4,264,338 A | * | 4/1981 | Null ........................ 95/47 |
| 5,064,447 A | | 11/1991 | Lee | |
| 5,281,253 A | * | 1/1994 | Thompson ............... 95/22 |
| 5,282,969 A | * | 2/1994 | Xu ........................ 210/640 |
| 5,378,263 A | * | 1/1995 | Prasad ..................... 95/54 |

(Continued)

FOREIGN PATENT DOCUMENTS

| EP | 0 754 487 | | 1/1997 |
| EP | 1 034 836 | A1 | 9/2000 |
| EP | 1 080 774 | A1 | 3/2001 |
| JP | A 10-298118 | | 11/1998 |
| JP | A 11-345545 | | 12/1999 |
| JP | A 2000-140558 | | 5/2000 |
| JP | 2000-140576 | | 5/2000 |
| JP | A 2000-185212 | | 7/2000 |
| WO | WO 00/71232 | A1 | 11/2000 |

OTHER PUBLICATIONS

H. Hama et al., "Application Problems of $SF_6/N_2$ Mixtures to Gas Insulated Bus," Gaseous Dielectrics VIII, Ed. by Christophorou and Olthoff, 1998, pp. 353–359.

*Primary Examiner*—Robert H. Spitzer
(74) *Attorney, Agent, or Firm*—Young & Thompson (57) ABSTRACT

A halide gas separating and collecting device for separating and collecting halide gas from mixed gas containing the halide gas, wherein at least first and second stage separating membrane modules are stacked in multiple stages. The method comprises: feeding the mixed gas to the inlet of the first stage separating membrane module, feeding the gas passed through the previous separating membrane module to the inlets of the second and subsequent stage separating membrane modules, recycling the gas unpassed through the second and subsequent stage separating membrane modules to the inlet of the first stage separating membrane module, and controlling the flow of gas unpassed through the first stage separating membrane module by a control valve connected to the unpassed gas outlet of the first stage separating membrane module, whereby the halide gas can be separated and collected as unpassed gas at a high density and a high collection rate.

17 Claims, 2 Drawing Sheets

U.S. PATENT DOCUMENTS

| | | | |
|---|---|---|---|
| 5,429,662 A | * 7/1995 | Fillet | 95/14 |
| 5,730,779 A | 3/1998 | Chernyakov et al. | |
| 5,785,741 A | * 7/1998 | Li et al. | 96/4 |
| 5,855,647 A | * 1/1999 | Li et al. | 95/45 |
| 5,873,928 A | * 2/1999 | Callahan | 95/45 |
| 5,960,777 A | 10/1999 | Nemser et al. | |
| 5,976,222 A | * 11/1999 | Yang et al. | 95/45 |
| 6,096,114 A | * 8/2000 | Li et al. | 95/47 |
| 6,128,919 A | * 10/2000 | Daus et al. | 62/624 |
| 6,168,649 B1 | * 1/2001 | Jensvold et al. | 95/47 |
| 6,197,090 B1 | * 3/2001 | Yamashita et al. | 95/12 |
| 6,387,157 B1 | * 5/2002 | Yamashita | 95/45 |
| 6,482,251 B1 | * 11/2002 | Kawasaki et al. | 95/22 |
| 2002/0062734 A1 | * 5/2002 | Pittroff et al. | 95/47 |
| 2003/0047068 A1 | * 3/2003 | Brazier | 95/45 |

* cited by examiner

DEVICE AND METHOD FOR SEPARATING AND COLLECTING HALIDE GAS

TECHNICAL FIELD

The present invention relates to an apparatus and a method for separating and recovering a halide gas from a mixed gas containing the halide gas. More particularly, it relates to an apparatus and a method for separating and recovering a halide gas in high concentration and high recovery rate.

BACKGROUND ART

Halide gases, such as chlorofluorocarbon (CFC) gas, hydrochlorofluorocarbon (HCFC) gas, hydrofluorocarbon (HFC) gas, perfluorocarbon (PFC) gas, $SF_6$ gas, and $NF_3$ gas, have been used extensively in view of their chemical characteristics as a refrigerant, a blowing agent, a propellant, an electrically insulating gas, gas for metal refining, etchant gas or cleaning gas in semiconductor fabrication, and the like. However, it has been pursued since the late 80's to restrict or reduce the use of, or use substitutes for, CFC, HCFC, etc. because of their catalysis on destruction of the ozonophere and HFC, PFC, $SF_6$, etc. because of their very powerful greenhouse effect.

Nevertheless because satisfactory substitutes have not been discovered as yet, there still remain some applications in which halide gases continue being used. For example, there is found no satisfactory substitute for electrically insulating gas for gas-insulated electrical equipment, such as gas-insulated switchgears, gas circuit breakers, and gas-insulated transformers. Hence in an attempt to reduce use of halide gases, electric power industries have developed replacement of pure halide gases for electric insulation with mixed gases comprising a halide gas, e.g., $SF_6$ (sulfur hexafluoride), Freon or carbon tetrachloride, and a diluting gas such as $N_2$ gas. $SF_6$ gas is characterized by high dielectric strength upon being pressurized and by lower liquefying temperature than Freon or carbon tetrachloride gas, which enables use in low temperatures. Therefore, a mixed gas comprising $SF_6$ gas and a diluting gas is a highly promising substitute as an electrically insulating gas.

A mixed gas of $SF_6$ gas and a diluting gas also finds use as a protective cover gas during casting in magnesium foundries.

Semiconductor fabrication sites use halide gases, such as perfluorocarbon (PFC) gas, hydrofluorocarbon (HFC) gas, $SF_6$ gas, and $NF_3$ gas, as an etchant gas or a cleaning gas and emit mixed gases comprising the halide gas and a diluting gas such as $N_2$ gas.

After released into the atmosphere, halide gases such as HFC, PFC, and $SF_6$ sustain in the atmosphere without decomposition for an extremely long period of time because of their high chemical stability. If emitted into the atmosphere, however in a small amount, they will be accumulated in the atmosphere to give considerably serious influences to the global environment. Emission of halide gases into the atmosphere should therefore be minimized.

The electric power industry and the semiconductor industry have already set up definite targets for reducing use of halide gases and for controlling emission of halide gases, and various efforts have been made to achieve the targets. For example, Federation of Electric Power Companies (Japan) set the target of $SF_6$ gas recovery rate at 97% during maintenance work and 99% at disposal of equipment by 2005. For guidelines of reuse, 97% by volume or higher purity is demanded for $SF_6$ gas concentration in Japan. International Council on Large Electric Systems (CIGRE) WG 23.10 Task Force 01 demands 98% by volume or higher in Recycling Guide—Re-use of $SF_6$ Gas in Electrical Power Equipment and Final Disposal, 1997.

Under these circumstances, an apparatus and a method for separating and recovering a halide gas from a halide gas-containing mixed gas in high concentration (at high purity) economically with minimized recovery loss are desired.

Halide gases being expensive, it would be extremely economical to recover them with high purity and reuse them.

Pressure cooling has been studied as a method of separating and recovering a halide gas from a mixed gas of a halide gas and other gas. However, the pressure cooling method generally needs high pressure and low temperature. Considering an extremely high pressure and an extremely low temperature required for achieving a high recovery rate of a halide gas with reduced recovery loss, it is practically difficult to recover a halide gas at high recovery rates. For example, H. Hama et al. report that treatment of a mixed gas having an $SF_6$ content of 7% or less at 3.5 MPa and $-50°$ C. resulted 0% liquefaction, proving virtual impossibility of $SF_6$ gas recovery from a mixed gas having an $SF_6$ gas content of 10% or less (8th International Symposium on Gaseous Dielectrics, Virginia Beach, June 22-I, "Application problems of $SF_6/N_2$ mixtures to gas insulated bus" (1998). They also revealed that the liquefaction rate (recovery rate) of even a mixed gas having 50% $SF_6$ gas treated at 3.5 MPa and $-10°$ C. does not reach 50%.

That is, the recovery rate of $SF_6$ gas from an $SF_6$ gas/diluting gas mixture used as an electrically insulating gas achievable by pressure cooling under practical conditions is about 50%. This means difficulty in separating and recovering $SF_6$ gas at a high recovery rate with a reduced recovery loss.

JP-A-11-345545 proposes using a gas separation membrane selected from a polyimide membrane, a carbon membrane, and a zeolite membrane as an effective substitute for the pressure cooling method in the separation and recovery of $SF_6$ gas. According to this method $SF_6$ gas is separated and recovered as non-permeate gas of the gas separation membrane. It is true that $SF_6$ gas has a smaller rate of permeation than other gas of a mixed gas (e.g., $N_2$ gas), but this does not mean that $SF_6$ gas is incapable of passing through a gas separation membrane at all. $SF_6$ gas, while not much compared with other gas (e.g., $N_2$ gas), also enters a permeate gas stream through a gas separation membrane together with the other gas. The $SF_6$ in the permeate gas results in recovery loss. This recovery loss increases with an attempt to increase the purity of $SF_6$ gas in the non-permeate. Therefore, it is difficult to separate and recover $SF_6$ gas with a high concentration (high purity) at a high recovery rate.

JP-A-2000-140558 discloses a method and an apparatus for separating and recovering $SF_6$ gas from an $SF_6$-containing mixed gas by use of an aromatic polyimide separation membrane. The publication is silent to a specific process or a specific apparatus with which a halide gas can be recovered with a reduced recovery loss and with a high purity enough to be reused.

JP-A-2000-185212 discloses a method and an apparatus for separating and recovering a perfluorocompound gas from a perfluorocompound-containing mixed gas by use of an asymmetric carbon membrane obtained by carbonizing an asymmetric polyimide film. This publication has no mention of a specific process or a specific apparatus with which a halide gas can be recovered with a reduced recovery loss and with a high purity enough to be reused.

JP-A-10-128034 discloses a method of separating and recovering a fluorochemical gas from a mixed gas containing a diluting gas and the fluorochemical gas by use of gas separation membranes, wherein the non-permeate gas of a first gas separation membrane is led to a second gas separation membrane, and the non-permeate gas of the second gas separation membrane is collected as a separated and recovered fluorochemical gas.

JP-A-9-103633 proposes a method and an apparatus for separating and recovering a perfluorocompound gas from a gas mixture using a gas separation membrane made of a glassy polymer, wherein the non-permeate gas of a first gas separation membrane is led to a second gas separation membrane, and the non-permeate gas of the second gas separation membrane is collected as a separated and recovered perfluorocompound gas.

JP-A-10-298118 discloses a method and a system for separating and recovering a perfluorocompound gas from a gas mixture using gas separation membranes including a carbon sieve membrane, wherein the non-permeate stream of a first gas separation membrane is sent to a second gas separation membrane, and the non-permeate stream of the second gas separation membrane is collected as a separated and recovered perfluorocompound gas.

These methods using a plurality of gas separation membranes are suitable to recover a fluorochemical gas or a perfluorocompound gas with a higher purity from a mixed gas. However, the methods also involve the recovery loss problem due to passage of a fluorochemical gas or a perfluorocompound gas through the first gas separation membrane together with a diluting gas. Electrically insulating gas comprising a mixture of, for instance, $SF_6$ gas and a diluting gas usually has a relatively high $SF_6$ content ranging 3 to 60% by volume. When these methods are applied to the separation and recovery of $SF_6$ gas from such an electrically insulating gas, it is difficult to separate and recover $SF_6$ gas in high concentration (high purity) at high recovery rate since an unignorable amount of $SF_6$ gas is emitted together with the permeate gas of the first gas separation membrane.

The technique using a gas separation membrane is superior to the pressure cooling method for the separation and recovery of a halide gas from a halide gas-containing mixed gas. In the light of the above-mentioned problem notwithstanding the superiority, it has been desired to develop an improved apparatus and an improved method capable of reducing the recovery loss of a halide gas and increasing the purity of the recovered gas to a level enough to be reused.

DISCLOSURE OF THE INVENTION

An object of the present invention is to provide an apparatus and a method for separating and recovering a halide gas harmful to the global environment with high purity and at high recovery rate from a halide gas-containing mixed gas used in gas-insulated electric equipment or semiconductor fabrication equipment.

The present invention relates to an apparatus for separating and recovering a halide gas comprising at least first and second stage separation membrane modules which is characterized in that the first stage separation membrane module has a gas inlet thereof connected to a source of a mixed gas containing a halide gas and a non-permeate gas outlet thereof connected via a gas flow control valve to a gas recovery container, and the second stage separation membrane module has a gas inlet thereof connected to the permeate gas outlet of the first separation membrane module and a non-permeate gas outlet thereof connected to the source of the halide gas-containing mixed gas.

The apparatus of the present invention includes the following preferred embodiments.
1) The non-permeate gas outlet of the first stage separation membrane module is connected to the gas recovery container via the gas flow control valve and a gas concentration detector.
2) The gas concentration detector and the gas flow control valve are coupled by a controller into a configuration such that the gas flow control valve is controlled based on a measured value of the gas concentration detector so as to adjust the amount of the gas collected from the non-permeate gas outlet.
3) The separation membrane module is configured to be maintained at a constant temperature in a range of from 40 to 200° C. by a heating unit.
4) The apparatus has at least three separation membrane modules, wherein each of the third and the following stage separation membrane modules has the gas inlet thereof connected to the permeate gas outlet of the immediately preceding separation membrane module and the non-permeate gas outlet thereof connected to the source of the halide gas-containing mixed gas.
5) The separation membrane module comprises an aromatic polyimide hollow fiber separation membrane.
6) The separation membrane module comprises a carbonized separation membrane obtained by carbonizing a polymer.
7) The carbonized separation membrane is a partially carbonized hollow fiber separation membrane obtained by partially carbonizing an aromatic polyimide asymmetric hollow fiber membrane.
8) The mixed gas of the mixed gas source is an electrically insulating gas containing a halide gas and a diluting gas.
9) The halide gas is $SF_6$ gas.
10) The mixed gas of the mixed gas source has a halide gas concentration of 3 to 60% by volume.

The present invention also relates to a method of separating and recovering a halide gas from a mixed gas containing the halide gas through multiple stages using at least two separation membrane modules, which comprises the steps of feeding a mixed gas containing a halide gas to the gas inlet of the first stage separation membrane module, feeding, to the gas inlet of each of the second and the following stage separation membrane modules, a permeate gas of an immediately preceding stage separation membrane module, recycling the non-permeate gas of each of the second and the following stage separation membrane modules to the gas inlet of the first stage separation membrane module, and collecting the non-permeate gas of the first stage separation membrane module with a prescribed halide gas concentration while controlling the non-permeate gas flow from the first stage separation membrane module with a gas flow control valve connected to the non-permeate gas outlet of the first stage separation membrane module.

The method of the present invention includes the following preferred embodiments.
11) A gas concentration detector and the gas flow control valve are connected to the non-permeate gas outlet of the first stage separation membrane module in such a configuration that the gas concentration detector measures the halide gas concentration of the non-permeate gas discharged from the non-permeate gas outlet of the first stage separation membrane module and that the gas flow control valve controls the non-permeate gas flow based on the measured value of the gas concentration detector thereby to collect the halide gas in a prescribed concentration.

12) The separation membrane module is configured to be maintained at a constant temperature in a range of from 40 to 200° C. by a heating unit.

13) The separation membrane module comprises an aromatic polyimide hollow fiber separation membrane.

14) The separation membrane module comprises a carbonized separation membrane obtained by carbonizing a polymer.

15) The carbonized separation membrane is a partially carbonized hollow fiber separation membrane obtained by partially carbonizing an aromatic polyimide asymmetric hollow fiber membrane.

BEST MODE FOR CARRYING OUT THE INVENTION

The halide gas according to the present invention includes chlorofluorocarbon (CFC) gases, such as $CClF_3$ gas, $CClF_2CF_3$ gas, and $CCl_2F_2$ gas, hydrochlorofluorocarbon (HCFC) gases, such as $CHClF_2$ gas, $CHClFCF_3$ gas and $CH_3CClF_2$ gas, hydrofluorocarbon (HFC) gases, such as $CHF_3$ gas and $CHF_2CF_3$ gas, perfluorocarbon (PFC) gases, such as $CF_4$ gas and $C_2F_6$ gas, perfluorocompound gases, such as $SF_6$ gas and $NF_3$ gas, and mixtures thereof. The halide gases particularly contemplated in the present invention are hydrofluorocarbon (HFC) gases, perfluorocarbon (PFC) gases, perfluorocompound gases, e.g., $SF_6$ gas and $NF_3$ gas, and mixtures thereof, which are still used as an electrically insulating gas or a gas in the fabrication of semiconductors, and emission of which into the atmosphere, however small, should be minimized because otherwise they will be accumulated in the atmosphere owing to their chemical stability to produce a considerable greenhouse effect.

The halide gases which are typically dealt with in the present invention include, but are not limited to, $SF_6$ gas, $NF_3$ gas, $BF_3$ gas, $SiF_4$ gas, $CF_4$ gas, $C_2F_6$ gas, $C_3F_8$ gas, $C_4F_{10}$ gas, $C_2F_4$ gas, $C_3F_6$ gas, $CHF_3$ gas, $CH_3F$ gas, and $C_2HF_5$ gas.

The diluting gases contemplated in the present invention include, but are not limited to, nitrogen gas, carbonic acid gas, helium gas, argon gas, hydrogen gas, air, and mixtures thereof.

The mixed gas treated in the present invention comprises at least one halide gas and at least one diluting gas.

The mixed gas containing a halide gas and a diluting gas which is treated by the present invention includes an electrically insulating gas sealed into gas-insulated electric equipment, such as gas-insulated switchgears, gas circuit breakers, and gas-insulated transformers. Such an electrically insulating gas is typically a mixed gas comprising $SF_6$ gas and $N_2$ gas, especially a mixed gas comprising 3 to 60% by volume of $SF_6$ gas and 40 to 97% by volume of $N_2$ gas.

The mixed gas containing a halide gas and a diluting gas which is treated by the present invention also includes etchant gases and cleaning gases emitted from semiconductor fabrication equipment. In this field, though different gases are used depending on equipment, typical examples are mixtures comprising one or more halide gases, e.g., $SF_6$ gas, $NF_3$ gas, $CF_4$ gas, $C_2F_6$ gas, $C_3H_8$ gas, $CHF_3$ gas, etc. and a diluting gas, e.g., $N_2$ gas. The halide gas concentration in these mixed gases is usually not higher than several percent by volume.

The separation membrane modules used in the present invention each comprise a container which has a gas inlet, a permeate gas outlet, and a non-permeate gas outlet and is equipped with a selectively gas permeable separation membrane to form a gas feed side space and a permeate side space isolated from each other. While the gas separation membrane may be a flat sheet membrane, a thin and small-diametered hollow fiber membrane is advantageous for size reduction of the apparatus and a larger membrane area that assures high separation efficiency and good economy. The gas separation membrane may be either homogeneous or heterogeneous as in a composite membrane or an asymmetrical membrane or may be either microporous or nonporous. Suitable hollow fiber membranes have a thickness of 10 to 500 $\mu M$ and an outer diameter of 50 to 2000 $\mu m$.

Suitable examples of the separation membrane modules used in the present invention include those using gas separation membranes made of polymers, such as polyimide, polyether imide, polyamide, polyamide-imide, polysulfone, polycarbonate, and cellulosic polymers, and ceramics, such as zeolite. In particular, aromatic polyimide hollow fiber separation membranes, especially aromatic polyimide asymmetric hollow fiber separation membranes exhibit high separation performance between halide gases and diluting gases, e.g., $N_2$ gas, high durability against halide gases, and sufficient heat resistance. Accordingly, an aromatic polyimide asymmetric hollow fiber separation membrane, when used in the first stage separation membrane module, achieves separation and recovery of a halide gas in a prescribed high concentration (high purity) as a non-permeate gas. Such a separation membrane allows elevation of the separation temperature to raise the separation efficiency. In addition, with this membrane, the separation operation can be continued for an extended period of time in a stable manner because the membrane is hardly susceptible to deterioration by halides or high temperature. For these reasons an aromatic polyimide hollow fiber separation membrane, especially an aromatic polyimide asymmetric hollow fiber separation membrane is particularly preferred in the present invention.

The aromatic polyimide separation membrane is preferably, but not necessarily, prepared by, for example, the processes taught in JP-A-5-68859 and JP-A-6-254367.

Separation membrane modules using a carbonized separation membrane obtained by carbonizing a polymer are also preferred. The carbonized separation membranes obtained by polymer carbonization include a carbon membrane obtained by pyrolyzing a membrane formed of cellulose, etc. in high temperatures of 800 to 950° C. for a long time as taught in U.S. Pat. No. 4,685,940; one consisting essentially of carbon that is obtained by subjecting the above-described carbon membrane to CVD processing, plasma treatment or oxidation treatment; and a porous hollow carbon fiber membrane consisting essentially of carbon that is obtained by spinning a mixture of polyacrylonitrile, a component decomposing at low temperatures of 600° C. or lower, and a solvent into hollow fibers and treating the resulting hollow fibers at preferably 600 to 1200° C. to cause the decomposable component to decompose and dissipate as disclosed in JP-A-2-74615.

The hollow fiber separation membrane to be used may be one having an asymmetric structure that is obtained by partially carbonizing an aromatic polyimide asymmetric hollow fiber membrane by low-temperature and/or short-time heat treatment as disclosed in JP-A-4-11933, JP-A-4-193334, JP-A-5-220360, and JP-A-2000-342944.

Carbonized separation membranes obtained by polymer carbonization exhibit high separation performance between halide gases and diluting gases, e.g., $N_2$ gas, high durability against halide gases, and sufficient heat resistance. Accordingly, the carbonized separation membrane obtained by polymer carbonization, when used in the first stage separation membrane module, achieves separation and recovery of a halide gas in a prescribed high concentration (high purity) as a non-permeate gas. Such a separation membrane allows elevation of the separation temperature to raise the separation efficiency. In addition, with this membrane, the separation operation can be continued for an extended period of time in a stable manner because the membrane is hardly susceptible to deterioration by halides or high temperature.

Inter alia, hollow fiber separation membranes with an asymmetric structure which are obtained by partial carbonization of aromatic polyimide asymmetric hollow fiber membranes are highly advantageous in view of ease of fabrication and economy. That is, the aromatic polyimide asymmetric hollow fiber membranes as precursors are easy to fabricate, and the processing step involved is partial carbonization that can be accomplished by heating at a relatively low temperature for a short period of time. Besides, the hollow fiber separation membranes of this type exhibit extremely high separation performance and are easily designed to have relatively small diameters while retaining mechanical strength required for industrial modularization. It is easy with this type of hollow fiber separation membranes to provide separation membrane modules having high separation performance and a large effective membrane area, with which a halide gas can be separated and recovered with extremely high efficiency.

For these reasons a separation membrane module having a hollow fiber separation membrane obtained by partially carbonizing an aromatic polyimide asymmetric hollow fiber separation membrane is particularly suitable for use in the present invention.

Where the separation membrane module used in the present invention is composed of the hollow fiber membrane, the module generally has the following structure. A large number (e.g., several hundreds to several hundreds of thousands) of hollow fiber membranes are gathered into a bundle. The hollow fibers of the bundle are firmly fixed to each other at one or both end portions thereof with a curing resin (e.g., an epoxy resin), a thermoplastic resin (e.g., a polyamide resin), etc. to make a hollow fiber separation membrane element with both ends of the individual fibers open. One or more than one elements thus prepared are set in a container having at least a gas inlet, a permeate gas outlet, and a non-permeate gas outlet in such a manner that the space leading to the inside of the individual hollow fibers and the space leading to the outside of the hollow fibers are isolated from each other. The container is made of metallic materials such as stainless steel, plastics, and composite materials such as fiber-reinforced plastics.

The separation membrane modules used in the present invention are not particularly limited in shape and can have a commonly employed shape. The hollow fibers are bundled in a parallel configuration, a crossing configuration, a woven configuration or a helical configuration. The hollow fiber bundle may have a core tube in substantially the center thereof. The outer peripheral surface of the hollow fiber bundle may be wrapped in a film. The shape of the hollow fiber bundle includes cylinders, flat plates, and prisms. The hollow fiber bundle can be placed in the container as such or as bent into a U-shape or as wound into a helical shape. The separation membrane modules used in the present invention may be of bore feed mode or shell feed mode.

The apparatus of the present invention for separating and recovering a halide gas has at least two stage separation membrane modules. The first stage separation membrane module has its gas inlet connected to a mixed gas source containing a halide gas and its non-permeate gas outlet connected via a gas flow control valve to a gas recovery container. The second separation membrane module has its gas inlet connected to the permeate gas outlet of the first stage separation membrane module and its non-permeate outlet connected to the mixed gas source containing the halide gas.

In a preferred configuration of the halide gas separation and recovery apparatus of the present invention, the first stage separation membrane module has its non-permeate outlet connected to the gas recovery container via a gas concentration detector and the gas flow control valve. Still preferably, the gas concentration detector and the gas flow control valve are coupled by a controller so that the gas flow control valve is controlled based on a measured value of the gas concentration detector thereby to adjust the amount of the gas emitted from the non-permeate gas outlet of the first stage separation membrane module.

Figure 1:
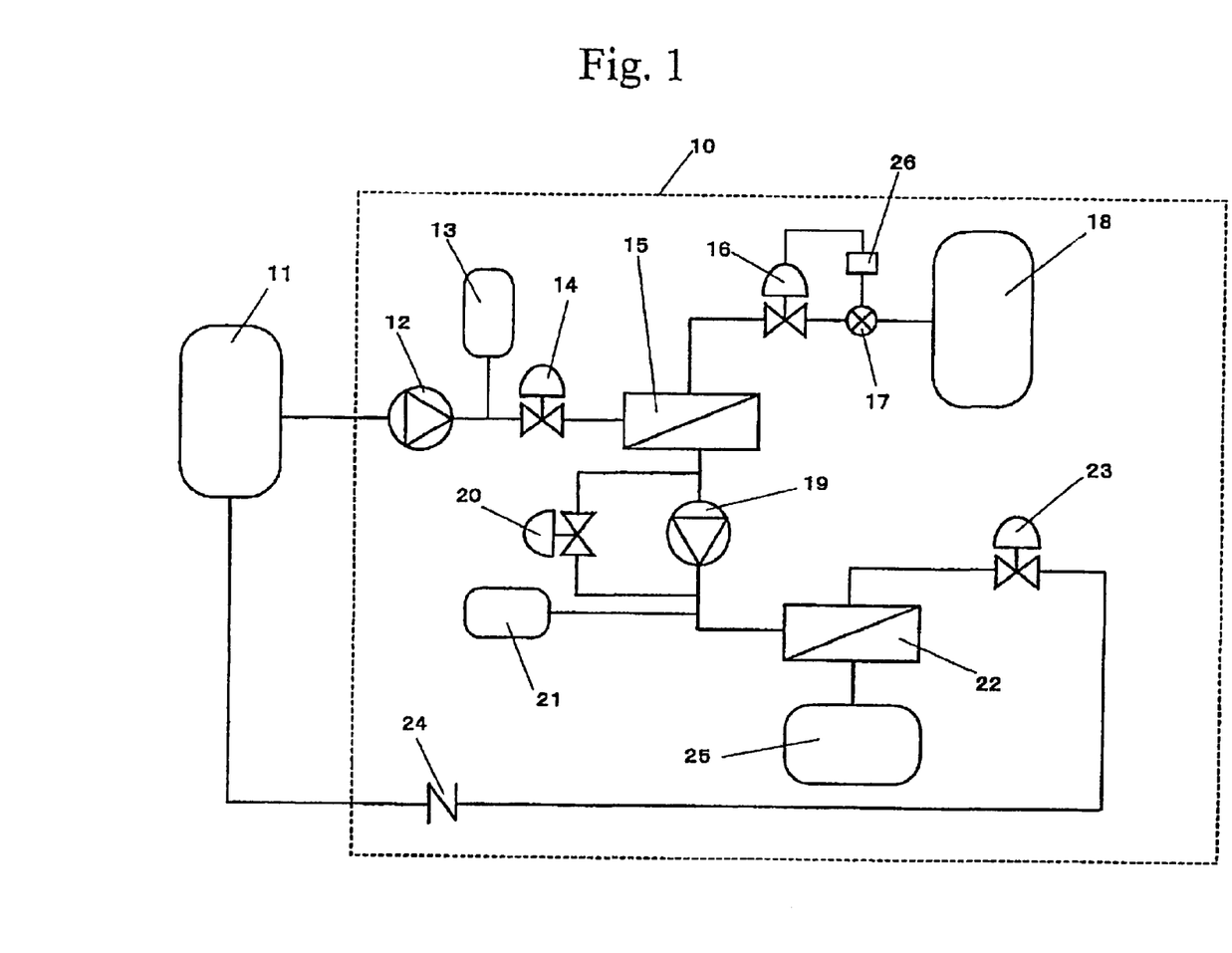
FIG. 1 illustrates the configuration of an embodiment of the apparatus according to the present invention.

An illustrative embodiment of the apparatus according to the present invention is shown in FIG. 1. FIG. 1 illustrates the configuration of the apparatus according to the present invention. The present invention will be described in greater detail by referring to FIG. 1. In FIG. 1, numeral 11 indicates a mixed gas source containing a halide gas. The mixed gas source may be either a piece of such equipment as gas-insulated electric equipment, e.g., a gas-insulated switchgear, a gas circuit breaker or a gas-insulated transformer, or semiconductor fabrication equipment or a storage tank in which a halide gas-containing mixed gas emitted from such equipment is stored. The halide gas-containing mixed gas of the mixed gas source 11 is introduced through a conduit pipe into an apparatus 10 of the present invention. The part surrounded by the dotted line in FIG. 1 is the apparatus of the present invention. If needed, the mixed gas from the mixed gas source 11 may be led into the apparatus by means of a vacuum pump or a blower while not shown. The introduced mixed gas is pressurized in a compressor 12. Numerals 13 and 14 indicate a buffer tank and a pressure control valve, respectively, through which the mixed gas with a constant controlled pressure is fed to the gas inlet of a first stage separation membrane module 15. While the mixed gas flows in the first stage separation membrane module, the diluting gas in the mixed gas (e.g., $N_2$ gas) is selectively allowed to pass through the gas separation membrane. On the other hand, having a lower rate of permeation than the diluting gas, the halide gas (e.g., $SF_6$ gas) in the mixed gas is concentrated and recovered through the non-permeate gas outlet, while partly allowed to pass through the gas separation membrane. The non-permeate gas outlet connects via a gas concentration detector 17 and a gas flow control valve 16 to a gas recovery container 18. The gas concentration detector 17 measures the concentration of the halide gas concentrated and discharged from the non-permeate gas outlet, and the gas flow control valve 16 controls the amount of the gas discharged from the non-permeate gas outlet. When the opening of the gas flow control valve 16 is narrowed to reduce the gas flow from the non-permeate gas outlet, the amount of the permeate gas (i.e., the diluting gas plus a relatively small amount of the halide gas) which permeates through the gas separation membrane increases. This results in an increase in concentration of the halide gas recovered from the non-permeate gas outlet. Conversely, when the gas flow control valve 16 is opened to increase the gas flow from the non-permeate gas outlet, the amount of the diluting gas which passes through the gas separation membrane decreases, and the amount of the diluting gas remaining in the non-permeate gas increases relatively. It follows that the concentration of the halide gas collected from the non-permeate gas outlet decreases.

Since the concentration of the halide gas collected from the non-permeate gas outlet of the first stage separation membrane module can thus be adjusted to a prescribed high concentration (high purity), it is easy to reuse the recovered gas as a halide gas. Because a highly concentrated halide gas is easy to liquefy, the recovered halide gas may be liquefied with ease by pressure cooling. It is advantageous that the gas recovery container 18 be adapted to liquefy the halide gas and to store the liquid. In this case, the size of the container 18 can be markedly reduced as compared with a design for storing gas. Where the gas is liquefied by, for example, pressure cooling and stored in the form of liquid, the liquefied product will have a further increased purity, which is advantageous in reusing the stored liquid.

On the other hand, the permeate gas of the first stage separation membrane module 15 comprises the diluting gas as concentrated and the halide gas as diluted. The permeate gas outlet of the first stage separation membrane module 15 is connected via a compressor 19 to the gas inlet of a second stage separation membrane module 22. The permeate gas of the first stage separation membrane module 15 is pressurized in the compressor 19 and fed to the gas inlet of the second stage separation membrane module 22. Numeral 20 indicates a control valve for controlling the flow in a conduit bypassing the compressor 19, and numeral 21 a buffer tank. By these two units, the pressure and the flow of the gas fed to the second separation membrane module 22 can be adjusted. The non-permeate gas outlet of the second stage gas separation membrane module 22 is connected via a control valve 23 and a check valve 24 to the mixed gas source 11. The permeate gas outlet of the second stage separation membrane module 22 is connected to a recovery tank 25.

The halide gas of the mixed gas fed to the apparatus of the present invention can be separated and recovered with a prescribed high purity by controlling the gas flow by means of the gas flow control valve 16 which is connected to the non-permeate gas outlet of the first stage separation membrane module 15. From the permeate gas outlet of the first stage separation membrane module 15 is discharged a mixed gas comprising the diluting gas as concentrated and the halide gas that has permeated through the gas separation membrane together with the diluting gas. In particular, narrowing the opening of the gas flow control valve 16 to reduce the gas flow in order to separate and recover the halide gas with high purity as the non-permeate gas of the first stage separation membrane module 15 results in increase in amount of the halide gas that permeates the first stage separation membrane module 15 into the permeate side together with the diluting gas. In this case, emission of this permeate gas directly into the atmosphere would result in not only a failure to increase the recovery rate of the halide gas but also adverse influences on the global environment. In the apparatus of the present invention, the permeate gas from the first stage separation membrane module 15 is fed to the second stage separation membrane module 22, where it is again separated into the diluting gas and the halide gas. As a result, the permeate gas from the second stage separation membrane module 22 has a remarkably reduced halide gas content, and the diluting gas can be recovered with a higher concentration. The non-permeate gas from the second stage separation membrane module 22 contains the non-recovered halide gas. This non-permeate gas is recycled to the mixed gas source 11 and again fed to the first stage separation membrane module. Therefore, no recovery loss occurs, and an increased recovery rate of the halide gas can be obtained.

Steam is far more permeable through a gas separation membrane than halide gases and diluting gases. Even where the halide gas-containing mixed gas treated in the present invention contains steam, steam passes through the gas separation membranes with the diluting gas. As a result, the recovered halide gas is dry and suitable to be reused as an electrically insulating gas or a processing gas for semiconductor fabrication.

In a preferred configuration of the apparatus according to the present invention, the gas concentration detector 17 and the gas flow control valve 16 are coupled by a controller 26 as illustrated in FIG. 1. According to this configuration, the gas flow control valve 16 is controlled based on measured values of the gas concentration detector 17 so as to adjust the amount of the gas discharged from the non-permeate gas outlet. More specifically, the gas concentration detector 17 measures the concentration of the halide gas recovered as a non-permeate gas of the first stage separation membrane module 15. When the measured value is below a previously determined gas concentration, the controller 26 automatically narrows the opening of the gas flow control valve 16 to reduce the amount of the gas to be collected through the non-permeate gas outlet of the first stage separation membrane module 15 thereby to raise the recovered halide gas concentration to the predetermined level. When, on the other hand, the measured value is above the previously determined gas concentration, the controller 26 automatically opens the gas flow control valve 16 to increase the amount of the gas to be collected through the non-permeate gas outlet of the first stage separation membrane module 15 thereby to adjust the recovered halide gas concentration to the predetermined level. Such an automatic control system enables efficient separation and recovery of the halide gas with a predetermined high concentration.

The gas concentration detector 17 used in the present invention is not particularly limited as long as it is capable of detecting the concentration of a halide gas. Considering that the purpose of using the detector is to control the gas flow from the non-permeate gas outlet of the first stage separation membrane module, the detector is preferably such that is capable of rapidly providing measured values without requiring a long time for measurement. Detectors capable of converting measured values to electric signals are suitable. Such detectors include those utilizing difference in sound transmission velocity and those utilizing change in heat conductivity. The controller 26 can be of general type that carries out control through electrical signals. It may be of the type that sets a single value or of the type that sets two values, the upper and the lower limits. The gas flow control valve 16 can be of general type that opens and closes according to electrical signals.

Figure 2:
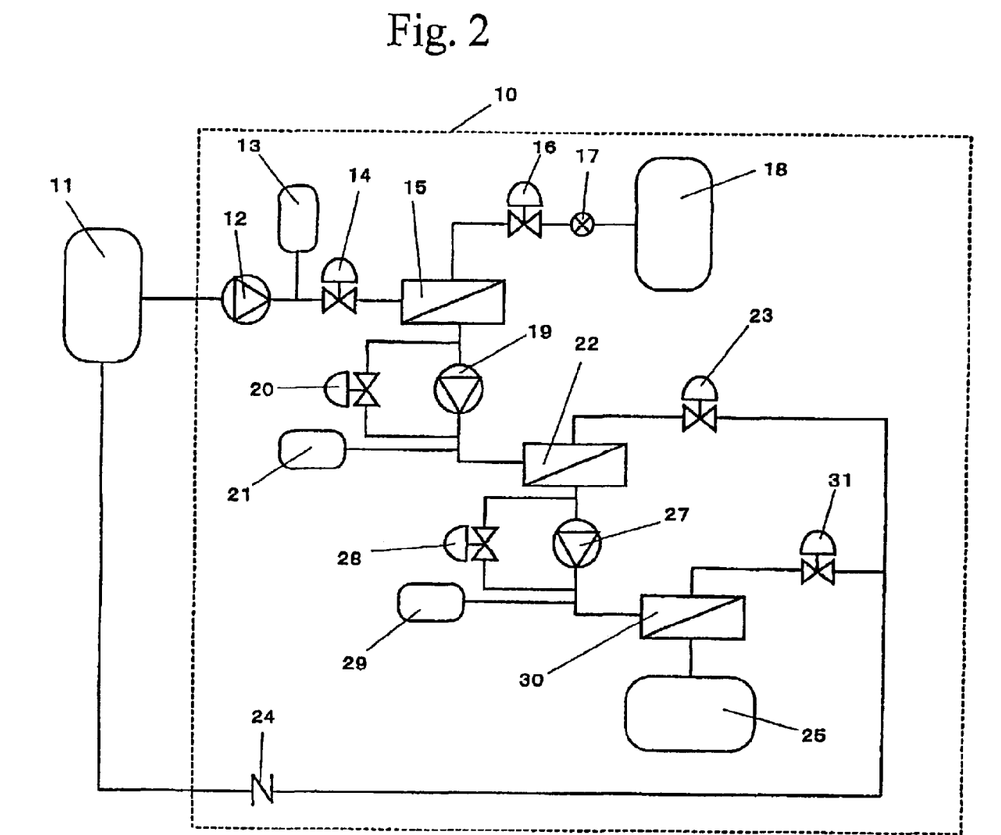
FIG. 2 illustrates the configuration of another embodiment of the apparatus according to the present invention.

Another illustrative embodiment of the apparatus according to the present invention is shown in FIG. 2. FIG. 2 illustrates the configuration of the apparatus of the present invention. In the embodiment shown in FIG. 2, the permeate gas outlet of the second separation membrane module 22 is connected via a compressor 27 to the gas inlet of a third stage separation membrane module 30. Numeral 28 indicates a control valve for controlling the flow in a conduit bypassing the compressor 27, and numeral 29 a buffer tank. The permeate gas of the second stage separation membrane module 22 is sent to the third separation membrane module 30 while having its pressure and flow adjusted by the compressor 27, the control valve 28, the buffer tank 29, and a control valve 31 which is connected to the non-permeate gas outlet of the third stage separation membrane module 30. The non-permeate gas outlet of the third stage gas separation membrane module 30 is connected via the control valve 31 and a check valve 24 to the mixed gas source 11. According to the embodiment of FIG. 2, even where the permeate gas discharged from the second stage separation membrane module 22 still contains the halide gas in such a concentration that is not ignorable as a recovery loss or not acceptable from the considerations for the global environment, it is introduced into the third separation membrane module 30, where it is separated into the diluting gas and the halide gas. As a result, the diluting gas can be recovered in a higher concentration with a lower halide gas content as a permeate gas from the third stage separation membrane module 30. While the non-permeate gas of the third stage separation membrane module 30 still contains the halide gas, it is recycled to the mixed gas source 11 and again fed to the first stage gas separation membrane module. Therefore, the residual halide gas never becomes a recovery loss but contributes to an increase of the halide gas recovery rate.

It is possible for this apparatus of the present invention to have one or more additional separation membrane modules having the same structure as the third stage separation membrane module so that the amount of the halide gas in the permeate gas from the final stage separation membrane module may be reduced to a level ignorable as a recovery loss or acceptable for the global environment.

It is desirable in the present invention that the separation of gas be carried out while maintaining the separation membrane module at a constant temperature in a range of from 40 to 200° C.

Gas separation performance of a gas separation membrane is influenced by temperature. Where the gas separation membrane is not kept at a constant temperature, for example, when the separation membrane module is exposed to the influence of external temperature, it would be necessary to control the gas flow control valve so frequently with temperature changes, and it would be difficult to separate and recover a halide gas with a prescribed concentration (purity) at a prescribed recovery rate. In order to separate and recover a halide gas in a high concentration at a high recovery rate as aimed in the present invention, it is particularly important to maintain the separation membrane module at a constant temperature.

Because gas separation membranes generally show higher rates of gas permeation at higher temperatures, the separation treatment is preferably conducted at higher temperatures. Further, the separation membrane tends to adsorb a halide gas to reduce its separating performance after long-term use. Adsorption of a halide gas onto the separation membrane can be suppressed by maintaining the module at high temperatures. The temperature at which the separation membrane module is to be maintained is 40° C. or higher, preferably 80° C. or higher, still preferably 110° C. or higher. On the other hand, where maintained at too high temperatures, the separation membrane module, inclusive of the separation membrane and other elements, must be so heat resistant, and high energy consumption will lead to bad economy. Hence, the temperature at which the module is to be maintained is 200° C. or lower, preferably 180° C. or lower, still preferably 150° C. or lower.

In order to maintain the separation membrane module at a temperature within the above-recited range, the module is provided with a heating unit having a temperature control function. The heating unit comprises, for example, a temperature sensor, a heater, and a controller capable of controlling these tools.

In the apparatus of the present invention, the permeate gas discharged from the permeate gas outlet of the final stage separation membrane module mainly comprises the concentrated diluting gas. It is possible to reduce the halide gas content of this permeate gas to such a level that is acceptable as a recovery loss or for the global environment. Therefore, the permeate gas from the final stage is permitted to be emitted into the atmosphere as such. If desired, the final permeate gas may be subjected to treatment with an adsorbent before emission or once stored in a recovery tank and then subjected to an appropriate treatment.

If necessary, the apparatus of the present invention may be equipped with a dust filter, an oil separator, a mist separator, a scrubber, a thermometer, a pressure gauge, a unit for treatment with an adsorbent, a gas concentration analyzer, a reducing valve, a flow control valve, a heating unit, a cooling unit, a pressurizing unit, a vacuum pump, a tank, and the like. Where the halide gas-containing mixed gas contains small amounts of impurities (such as gases resulting from deterioration of a halide gas), the apparatus may be configured to remove such impurities before the mixed gas is fed to the first stage separation membrane module by means of a unit for treatment with an adsorbent or a scrubber. Where the mixed gas has an extremely low halide gas concentration, it may be preliminarily concentrated to raise its halide gas concentration to about 1% by volume, preferably about 3% by volume, before it is fed to the first stage separation membrane module. The halide gas-containing mixed gas may be once heated or cooled to a predetermined temperature and then supplied to the first stage separation membrane module.

The halide gas separation and recovery method according to the present invention is a method of separating and recovering a halide gas through multiple stages using at least two separation membrane modules, which is characterized by comprising the steps of feeding a mixed gas containing a halide gas to the gas inlet of a first stage separation membrane module, feeding, to the gas inlet of each of the second and the following stage separation membrane modules, a permeate gas of an immediately preceding stage separation membrane module, recycling the non-permeate gas of each of the second and the following stage separation membrane modules to the gas inlet of the first stage separation membrane module, and collecting the halide gas as a non-permeate gas of the first stage separation membrane module in a prescribed concentration while controlling the non-permeate gas flow from the first stage separation membrane module with a gas flow control valve connected to the non-permeate gas outlet of the first stage separation membrane module. This method makes it possible to arbitrarily adjust the concentration of the recovered halide gas. The halide gas that constitutes a recover loss is only the one present in the gas mainly comprising the diluting gas that is emitted from the permeate gas outlet of the final stage separation membrane module. It is possible to reduce a recovery loss to an extremely low level. That is, the method of the present invention enables separation and recovery of a halide gas in high concentrations (purity) at high recover rates.

Still preferably, the halide gas separation and recovery method according to the present invention is characterized in that a gas concentration detector and the gas flow control valve are connected to the non-permeate gas outlet of the first stage separation membrane module. In this preferred method, the gas concentration detector measures the halide gas concentration of the non-permeate gas discharged from the non-permeate gas outlet, and the gas flow control valve controls the flow of the non-permeate gas based on the measured value of the gas concentration detector, whereby the non-permeate gas is recovered as a halide gas in a controlled concentration. According to this method, it is easy to adjust the concentration of the halide gas to be recovered to an arbitrarily decided concentration. In particular, it is easy to recover the halide gas in a high concentration (with a high purity) acceptable for reuse.

Taking reusability into consideration, the halide gas concentration in the non-permeate gas recovered from the first stage separation membrane module is suitably 90% by volume or higher, preferably 95% by volume or higher, still preferably 98% by volume or higher. In order to minimize adverse influences on the global environment, the recovery loss is suitably 10% or less, preferably 3% or less, still preferably 1% or less.

The "recovery loss" and the "recovery rate" of a halide gas as referred to in the present invention are obtained according to equations:

Recovery loss (%)=(amount of halide gas in permeate gas of the final stage separation membrane module)/(amount of halide gas in non-permeate gas of the first stage separation membrane module+amount of halide gas in permeate gas of the final stage separation membrane module)×100

Recovery rate (%)=100−recovery loss

The present invention will now be illustrated with reference to Examples, but it should be understood that the present invention is not limited thereto.

EXAMPLE 1

Example 1 was carried out using an apparatus similar to the one shown in FIG. 1.

A gas-insulated electric apparatus having a capacity of 205 liters which was charged with a mixed gas of 10 vol % $SF_6$ gas and 90 vol % $N_2$ gas under a pressure of 0.25 MPa (absolute pressure, hereinafter the same) was used as a halide gas-containing mixed gas source 11. The mixed gas was pressurized in a compressor 12 and led via a pressure control valve 14 to the gas inlet of the first stage separation membrane module 15 under a pressure of 0.8 MPa. The first and second separation membrane modules 15 and 22 each had a large number of hollow fiber membranes. The hollow fiber membranes were aromatic polyimide asymmetric hollow fiber membranes prepared from 30 mmol, in terms of proportion (hereinafter the same), of 3,3',4,4'-biphenyltetracarboxylic acid dianhydride, 55 mmol of 2,2'-bis(3,4-dicarboxyphenyl)hexafluoropropane dianhydride, 15 mmol of pyromellitic dianhydride, 50 mmol of 3,7-diamino-2,8-dimethyldiphenylenesulfone, and 50 mmol of 2,2',5,5'-tetrachlorobenzidine. Each hollow fiber membrane had an outer diameter of 410 μm and an inner diameter of 280 μm. The hollow fiber membranes were gathered into a hollow fiber bundle, and both end portions of the bundle were firmly fixed with an epoxy resin. The bundle was set in a container having a gas inlet, a permeate gas outlet, and non-permeate gas outlet to make the separation membrane modules 15 and 22. These separation membrane modules 15 and 22 both had an effective membrane area of 2 $m^2$.

Of the mixed gas components introduced into the separation membrane module 15, the gas that did not permeate through the hollow fiber separation membrane was made to flow from the non-permeate gas outlet of the separation membrane module 15 and led via a gas flow control valve 16 and a gas concentration detector 17 to a gas recovery container 18 and thus recovered. In this route, a controller 26 automatically controlled the gas flow control valve 16 to regulate the non-permeate gas flow so that the $SF_6$ gas concentration measured in the gas concentration detector 17 might be 96 vol %. The permeate gas of the separation membrane module 15 flowing from the permeate gas outlet was adjusted to 0.4 MPa by a compressor 19 and led to the gas inlet of the second stage separation membrane module 22. The non-permeate gas of the second stage separation membrane module 22 flew from the non-permeate gas outlet and returned to the gas-insulated electric apparatus (mixed gas source 11) via a control valve 23 and a check valve 24. The permeate gas of the second stage separation membrane module 22 was led from the permeate gas outlet toward a recovery tank 25, where it was stored. Each of the separation membrane modules 15 and 22 was maintained at 100° C. by the respective ribbon heaters wound therearound. Each of the gas recovery container 18 and the recovery tank 25 was used after purging with a vacuum pump.

After 40-minute operation under these conditions, the amount of the gas collected in the gas recovery container 18 from the non-permeate gas outlet of the first stage separation membrane module 15 was 44 liters, and its $SF_6$ concentration was 96 vol %. The amount of the gas collected in the recovery tank 25 from the permeate gas outlet of the second stage separation membrane module was 400 liters, and its $SF_6$ gas concentration was 0.2 vol %. That is, the recovery loss and the recovery rate of $SF_6$ gas were 1.8% and 98.2%, respectively.

EXAMPLE 2

Example 2 was carried out as follows using the same apparatus as used in Example 1.

Similarly to Example 1, a gas-insulated electric apparatus having a capacity of 205 liters and charged with a mixed gas of 10 vol % $SF_6$ gas and 90 vol % $N_2$ gas under a pressure of 0.25 MPa was used as a halide gas-containing mixed gas source 11. The mixed gas was pressurized in the compressor 12 and led via the pressure control valve 14 to the gas inlet of the first stage separation membrane module 15 under a pressure of 0.8 MPa. Of the mixed gas components introduced into the separation membrane module 15, the gas that did not permeate through the hollow fiber separation membrane was made to flow from the non-permeate gas outlet of the separation membrane module 15 and led via the gas flow control valve 16 and the gas concentration detector 17 to the gas recovery container 18 and thus recovered. In this route, the controller 26 automatically controlled the gas flow control valve 16 to regulate the non-permeate gas flow so that the $SF_6$ gas concentration measured in the gas concentration detector 17 might be 99 vol %. The permeate gas of the separation membrane module 15 flowing from the permeate gas outlet was adjusted to 0.3 MPa by the compressor 19 and led to the gas inlet of the second stage separation membrane module 22. The non-permeate gas of the second stage separation membrane module 22 flew from the non-permeate gas outlet and returned to the gas-insulated electric apparatus (mixed gas source 11) via the control valve 23 and the check valve 24. The permeate gas of the second stage separation membrane module 22 was led from the permeate gas outlet toward the recovery tank 25, where it was stored. Each of the separation membrane modules 15 and 22 was maintained at 100° C. by the respective ribbon heaters wound therearound. Each of the gas recovery container 18 and the recovery tank 25 was used after purging with a vacuum pump.

After 40-minute operation under these conditions, the amount of the gas collected in the gas recovery container 18 from the non-permeate gas outlet of the first stage separation membrane module 15 was 36 liters, and its $SF_6$ concentration was 99 vol %. The amount of the gas collected in the recovery tank 25 from the permeate gas outlet of the second stage separation membrane module was 370 liters, and its $SF_6$ concentration was 0.1 vol % or lower. That is, the recovery loss and the recovery rate of $SF_6$ gas were 1.0% or less and 99.0% or higher, respectively.

REFERENCE EXAMPLE 1

Preparation of Polyimide Solution:

Into a separable flask equipped with a stirrer and a nitrogen gas introducing tube were charged raw materials of polyimide, i.e., 40 mmol of 3,3',4,4'-biphenyltetracarboxylic acid dianhydride, 45 mmol of 2,2'-bis(3,4-dicarboxyphenyl) hexafluoropropane dianhydride, and 15 mmol of pyromellitic dianhydride as acid components and 50 mmol of dimethyl-3,7-diaminodibenzothiophene-5,5-dioxide and 50 mmol of 2,2',5,5'-tetrachlorobenzidine as diamine components, together with 243 g of p-chlorophenol. The reaction mixture was allowed to polymerize at 180° C. for 33 hours in a nitrogen gas atmosphere while stirring to prepare an aromatic polyimide solution having an aromatic polyimide concentration of 20 wt %. The resulting polyimide solution had a rotational viscosity of 2700 P at 100° C.

Preparation of Asymmetric Hollow Fiber Membrane:

The polyimide solution was put into a spinning apparatus equipped with a hollow fiber spinning nozzle (outer diameter of annular opening: 800 μm; width of annular opening: 100 μm; outer diameter of core opening: 300 μm). The polyimide solution was extruded through the spinning nozzle while feeding nitrogen gas through the core opening of the spinning nozzle. The spun hollow fiber was passed through a nitrogen atmosphere, immersed in a primary coagulant bath (80 wt % aqueous ethanol solution) at 0° C., led into a secondary coagulant bath having guide rollers, where the fiber ran reciprocally as guided by the guide rollers to complete coagulation, and wound on a bobbin. The resulting aromatic polyimide hollow fiber membrane was thoroughly washed with ethanol. After exchanging the solvent for isooctane, the fiber was dried by heating at 100° C. to evaporate isooctane and then heat-treated at 270° C. for 30 minutes to give an aromatic polyimide asymmetric hollow fiber membrane having an outer diameter of about 240 μm and an inner diameter of about 160 μm.

Preparation of Partially Carbonized Membrane:

The aromatic polyimide asymmetric hollow fiber membrane was thermally is stabilized by preliminarily heating at 400° C. for 30 minutes in air with no tension applied. The hollow fiber membrane was then passed through a nitrogen-filled quartz glass tube which was placed in an electric tube furnace the inside of which was kept at 600° C. for a retention time of 4 minutes to obtain a partially carbonized asymmetric hollow fiber membrane having an outer diameter of about 200 μm and an inner diameter of about 140 μm.

REFERENCE EXAMPLE 2

Preparation of Polyimide Solution:

The same raw materials of polyimide as used in Reference Example 1 together with 331 g of p-chlorophenol were allowed to polymerize at 180° C. for 16 hours in the same manner as in Reference Example 1 to prepare an aromatic polyimide solution having an aromatic polyimide concentration of 16 wt %. The polyimide solution had a rotational viscosity of 1500 P at 100° C.

Preparation of Asymmetric Hollow Fiber Membrane:

The polyimide solution was charged into a spinning apparatus equipped with a hollow fiber spinning nozzle (outer diameter of annular opening: 1000 μm; width of annular opening: 200 μm; outer diameter of core opening: 400 μm). The polyimide solution was processed in the same manner as in Reference Example 1, except for using a 70 wt % aqueous ethanol solution as a coagulant bath, to obtain an aromatic polyimide asymmetric hollow fiber membrane having an outer diameter of about 360 μm and an inner diameter of about 270 μm.

Preparation of Partially Carbonized Membrane:

The aromatic polyimide asymmetric hollow fiber membrane was thermally stabilized by preliminarily heating at 400° C. for 30 minutes in air with no tension applied. The hollow fiber membrane was then passed through a nitrogen-filled quartz glass tube which was placed in an electric tube furnace the inside of which was kept at 600° C. for a retention time of 4 minutes to obtain a partially carbonized asymmetric hollow fiber membrane having an outer diameter of about 320 μm and an inner diameter of about 240 μm.

EXAMPLE 3

Example 3 was carried out as follows using an apparatus similar to the one shown in FIG. 1.

Each of the first stage separation membrane module 15 and the second stage separation membrane module 22 was prepared by bundling a large number of hollow fiber membranes having an outer diameter of about 200 μm and an inner diameter of about 140 μm which were prepared in Reference Example 1, securing both end portions of the bundle with an epoxy resin, and setting the bundle in a container having a gas inlet, a permeate gas outlet, and a non-permeate gas outlet. The separation membrane modules 15 and 22 had an effective membrane area of 2.2 $m^2$ and 0.65 $m^2$, respectively.

A 205-liter volume tank charged with a mixed gas of 10 vol % $CF_4$ gas and 90 vol % $N_2$ gas under a gas pressure of 0.25 MPa was used as a halide gas-containing mixed gas source 11. The mixed gas was pressurized in the compressor 12 and led via the pressure control valve 14 to the gas inlet of the first stage separation membrane module 15 under a pressure of 0.9 MPa. Of the mixed gas components introduced into the separation membrane module 15, the gas that did not permeate through the hollow fiber separation membrane was made to flow from the non-permeate gas outlet of the separation membrane module 15 and led via the gas flow control valve 16 and the gas concentration detector 17 to the gas recovery container 18 and thus recovered. In this route, the controller 26 automatically controlled the gas flow control valve 16 to regulate the non-permeate gas flow so that the $CF_4$ gas concentration measured in the gas concentration detector 17 might be 99 vol %. The permeate gas of the separation membrane module 15 flowing from the permeate gas outlet was adjusted to 0.5 MPa by the compressor 19 and led to the gas inlet of the second stage separation membrane module 22. The non-permeate gas of the second stage separation membrane module 22 flew from the non-permeate gas outlet and returned to the tank (mixed gas source 11) via the control valve 23 and the check valve 24. The permeate gas of the second stage separation membrane module 22 was led from the permeate gas outlet toward the recovery tank 25, where it was stored. Each of the separation membrane modules 15 and 22 was maintained at 100° C. by the respective ribbon heaters wound therearound. Each of the gas recovery container 18 and the recovery tank 25 was used after purging with a vacuum pump.

After 40-minute operation under these conditions, the amount of the gas collected in the gas recovery container 18 from the non-permeate gas outlet of the first stage separation membrane module 15 was 39 liters, and its $CF_4$ gas concentration was 99 vol %. The amount of the gas collected in the recovery tank 25 from the permeate gas outlet of the second stage separation membrane module was 391 liters, and its $CF_4$ gas concentration was 0.1 vol % or lower. That is, the recovery loss and the recovery rate of $CF_4$ gas were 1.0% or less and 99% or higher, respectively.

EXAMPLE 4

Example 4 was carried out as follows using the same apparatus as used in Example 3.

A 205-liter volume tank having charged therein a mixed gas of 10 vol % $NF_3$ gas and 90 vol % $N_2$ gas under a gas pressure of 0.25 MPa was used as a halide gas-containing mixed gas source 11. The mixed gas was pressurized in the compressor 12 and led via the pressure control valve 14 to the gas inlet of the first stage separation membrane module 15 under a pressure of 0.5 MPa. Of the mixed gas components introduced into the separation membrane module 15, the gas that did not permeate through the hollow fiber separation membrane was made to flow from the non-permeate gas outlet of the separation membrane module 15 and led via the gas flow control valve 16 and the gas concentration detector 17 to the gas recovery container 18 and thus recovered. In this route, the controller 26 automatically controlled the gas flow control valve 16 to regulate the non-permeate gas flow so that the $NF_3$ gas concentration measured in the gas concentration detector 17 might be 99 vol %. The permeate gas of the separation membrane module 15 flowing from the permeate gas outlet was adjusted to 0.6 MPa by the compressor 19 and led to the gas inlet of the second stage separation membrane module 22. The non-permeate gas of the second stage separation membrane module 22 flew from the non-permeate gas outlet and returned to the tank (mixed gas source 11) via the control valve 23 and the check valve 24. The permeate gas of the second stage separation membrane module 22 was led from the permeate gas outlet toward the recovery tank 25, where it was stored. Each of the separation membrane modules 15 and 22 was maintained at 50° C. by the respective ribbon heaters wound therearound. Each of the gas recovery container 18 and the recovery tank 25 was used after purging with a vacuum pump.

After 40-minute operation under these conditions, the amount of the gas collected in the gas recovery container 18 from the non-permeate gas outlet of the first stage separation membrane module 15 was 34 liters, and its $NF_3$ gas concentration was 99 vol %. The amount of the gas collected in the recovery tank 25 from the permeate gas outlet of the second stage separation membrane module was 289 liters, and its $NF_3$ gas concentration was 0.2 vol. % or lower. That is, the recovery loss and the recovery rate of $NF_3$ gas were 1.7% or less and 98.3% or higher, respectively.

EXAMPLE 5

Example 5 was carried out as follows using an apparatus similar to the one shown in FIG. 1.

Each of the first stage separation membrane module 15 and the second stage separation membrane module 22 was prepared in the same manner as in Example 3, except for using a large number of hollow fiber membranes having an outer diameter of about 320 $\mu$m and an inner diameter of about 240 $\mu$m which were prepared in Reference Example 2. The separation membrane modules 15 and 22 had an effective membrane area of 2.2 $m^2$ and 0.65 $m^2$, respectively.

A 205-liter volume tank having charged therein a mixed gas of 10 vol % $SF_6$ gas and 90 vol % $N_2$ gas under a gas pressure of 0.25 MPa was used as a halide gas-containing mixed gas source 11. The mixed gas was pressurized in the compressor 12 and led via the pressure control valve 14 to the gas inlet of the first stage separation membrane module 15 under a pressure of 0.8 MPa. Of the mixed gas components introduced into the separation membrane module 15, the gas that did not permeate through the hollow fiber separation membrane was made to flow from the non-permeate gas outlet of the separation membrane module 15 and led via the gas flow control valve 16 and the gas concentration detector 17 to the gas recovery container 18 and thus recovered. In this route, the controller 26 automatically controlled the gas flow control valve 16 to regulate the non-permeate gas flow so that the $SF_6$ gas concentration measured in the gas concentration detector 17 might be 99 vol %. The permeate gas of the separation membrane module 15 flowing from the permeate gas outlet was adjusted to 0.4 MPa by the compressor 19 and led to the gas inlet of the second stage separation membrane module 22. The non-permeate gas of the second stage separation membrane module 22 flew from the non-permeate gas outlet and returned to the tank (mixed gas source 11) via the control valve 23 and the check valve 24. The permeate gas of the second stage separation membrane module 22 was led from the permeate gas outlet toward the recovery tank 25, where it was stored. Each of the separation membrane modules 15 and 22 was maintained at 100° C. by the respective ribbon heaters wound therearound. Each of the gas recovery container 18 and the recovery tank 25 was used after purging with a vacuum pump.

After 40-minute operation under these conditions, the amount of the gas collected in the gas recovery container 18 from the non-permeate gas outlet of the first stage separation membrane module 15 was 22 liters, and its $SF_6$ gas concentration was 99 vol %. The amount of the gas collected in the recovery tank 25 from the permeate gas outlet of the second stage separation membrane module was 215 liters, and its $SF_6$ gas concentration was 0.1 vol % or lower. That is, the recovery loss and the recovery rate of $SF_6$ gas were 1.0% or less and 99.0% or higher, respectively.

EXAMPLE 6

Example 6 was carried out as follows using the same apparatus as used in Example 5.

A 205-liter volume tank having charged therein a mixed gas of 10 vol % $C_2F_6$ gas and 90 vol % $N_2$ gas under a gas pressure of 0.25 MPa was used as a halide gas-containing mixed gas source 11. The mixed gas was pressurized in the compressor 12 and led via the pressure control valve 14 to the gas inlet of the first stage separation membrane module 15 under a pressure of 0.8 MPa. Of the mixed gas components introduced into the separation membrane module 15, the gas that did not permeate through the hollow fiber separation membrane was made to flow from the non-permeate gas outlet of the separation membrane module 15 and led via the gas flow control valve 16 and the gas concentration detector 17 to the gas recovery container 18 and thus recovered. In this route, the controller 26 automatically controlled the gas flow control valve 16 to regulate the non-permeate gas flow so that the $C_2F_6$ gas concentration measured in the gas concentration detector 17 might be 99 vol %. The permeate gas of the separation membrane module 15 flowing from the permeate gas outlet was adjusted to 0.4 MPa by the compressor 19 and led to the gas inlet of the second stage separation membrane module 22. The non-permeate gas of the second stage separation membrane module 22 flew from the non-permeate gas outlet and returned to the tank (mixed gas source 11) via the control valve 23 and the check valve 24. The permeate gas of the second stage separation membrane module 22 was led from the permeate gas outlet toward the recovery tank 25, where it was stored. Each of the separation membrane modules 15 and 22 was maintained at 120° C. by the respective ribbon heaters wound therearound. Each of the gas recovery container 18 and the recovery tank 25 was used after purging with a vacuum pump.

After 35-minute operation under these conditions, the amount of the gas collected in the gas recovery container 18 from the non-permeate gas outlet of the first stage separation membrane module 15 was 44 liters, and its $C_2F_6$ gas concentration was 99 vol %. The amount of the gas collected in the recovery tank 25 from the permeate gas outlet of the second stage separation membrane module was 402 liters, and its $C_2F_6$ gas concentration was 0.1 vol % or lower. That is, the recovery loss and the recovery rate of $C_2F_6$ gas were 1.0% or less and 99.0% or higher, respectively.

Comparative Examples 1 to 3 are shown below. In Comparative Examples 1 to 3, a halide gas was separated and recovered with a purity of 99 vol % as a non-permeate gas in the same apparatus as used in Examples 3 to 5, except for using only the first but not the second stage separation membrane module. The recovery losses were much greater than in Examples, reaching 10% or even higher.

COMPARATIVE EXAMPLE 1

In the same apparatus as used in Example 3, the permeate gas outlet of the first stage separation membrane module 15 was connected directly to the recovery tank 25. The same mixed gas as in Example 3 was treated in this apparatus by using only the first but not the second stage separation membrane module under the same separation conditions as in Example 3. The non-permeate gas was collected in the gas recovery container 18, and the permeate gas in the recovery tank 25.

After 40-minute operation under the above conditions, the amount of the gas collected in the gas recovery container 18 was 39 liters, and its $CF_4$ gas concentration was 99 vol %. The amount of the gas collected in the recovery tank 25 was 401 liters, and its $CF_4$ gas concentration was 1.3 vol %. That is, the recovery loss and the recovery rate of $CF_4$ gas were 12% and 88%, respectively.

COMPARATIVE EXAMPLE 2

In the same apparatus as used in Example 4, the permeate gas outlet of the first stage separation membrane module 15 was connected directly to the recovery tank 25. The same mixed gas as in Example 4 was treated in this apparatus using only the first but not the second stage separation membrane module under the same separation conditions as in Example 4. The non-permeate gas was collected in the gas recovery container 18, and the permeate gas in the recovery tank 25.

After 40-minute operation under the above conditions, the amount of the gas collected in the gas recovery container 18 was 24 liters, and its $NF_3$ gas concentration was 99 vol %. The amount of the gas collected in the recovery tank 25 was 376 liters, and its $NF_3$ gas concentration was 4.2 vol %. As a result, the recovery loss and the recovery rate of $NF_3$ gas were 40% and 60%, respectively.

COMPARATIVE EXAMPLE 3

In the same apparatus as used in Example 5, the permeate gas outlet of the first stage separation membrane module 15 was connected directly to the recovery tank 25. The same mixed gas as used in Example 5 was treated in this apparatus using only the first but not the second stage separation membrane module under the same separation conditions as in Example 5. The non-permeate gas was collected in the gas recovery container 18, and the permeate gas in the recovery tank 25.

After 40-minute operation under the above conditions, the amount of the gas collected in the gas recovery container 18 was 22 liters, and its $SF_6$ gas concentration was 99 vol %. The amount of the gas collected in the recovery tank 25 was 218 liters, and its $SF_6$ gas concentration was 1.2 vol %. As a result, the recovery loss and the recovery rate of $SF_6$ gas were 11% and 89%, respectively.

INDUSTRIAL APPLICABILITY

Having the above-described constitution, the present invention produces the following effect. The present invention makes it possible to separate and recover a halide gas from a halide gas-containing mixed gas at a high concentration (a high purity) in a high recovery rate.

What is claimed is:

1. A method of separating and recovering a halide gas from a mixed gas containing the halide gas through multiple stages using at least two separation membrane modules, which is characterized by comprising the steps of:

feeding a mixed gas containing a halide gas to a gas inlet of a first stage separation membrane module;

feeding, to a gas inlet of each of a second and any following stage separation membrane modules, a permeate gas of an immediately preceding stage separation membrane module;

recycling a non-permeate gas of each of the second and any following stage separation membrane modules to the gas inlet of the first stage separation membrane module; and collecting a non-permeate gas of the first stage separation membrane module with a prescribed halide gas concentration while controlling the non-permeate gas flow from the first stage separation membrane module with a gas flow control valve connected to the non-permeate gas outlet of the first stage separation membrane module.

2. The method of separating and recovering a halide gas according to claim 1, wherein a gas concentration detector and the gas flow control valve are connected to the non-permeate gas outlet of the first stage separation membrane module in such a configuration that the gas concentration detector measures the halide gas concentration of the non-permeate gas discharged from the non-permeate gas outlet of the first stage separation membrane module and that the gas flow control valve controls the non-permeate gas flow based on the measured value of the gas concentration detector thereby to collect the halide gas in a prescribed concentration.

3. The method of separating and recovering a halide gas according to claim 1, wherein each of the separation membrane modules is configured to be maintained at a constant temperature in a range of from 40 to 200° C. by a heating unit.

4. The method of separating and recovering a halide gas according to claim 1, wherein each of the separation membrane modules comprises an aromatic polyimide hollow fiber separation membrane.

5. The method of separating and recovering a halide gas according to claim 1, wherein each of the separation membrane modules comprises a carbonized separation membrane obtained by carbonizing a polymer.

6. The method of separating and recovering a halide gas according to claim 5, wherein the carbonized separation membrane is a partially carbonized hollow fiber separation membrane obtained by partially carbonizing an aromatic polyimide asymmetric hollow fiber membrane.

7. An apparatus for separating and recovering a halide gas comprising at least first and second stage separation membrane modules which is characterized in that the first stage separation membrane module has a gas inlet thereof connected to a source of a mixed gas containing a halide gas and a non-permeate gas outlet thereof connected via a gas flow control valve to a gas recovery container, and the second stage separation membrane module has a gas inlet thereof connected to the permeate gas outlet of the first separation membrane module and a non-permeate gas outlet thereof connected to the source of the halide gas-containing mixed gas.

8. The apparatus for separating and recovering a halide gas according to claim 7, wherein the non-permeate gas outlet of the first stage separation membrane module is connected via the gas flow control valve and a gas concentration detector to the gas recovery container.

9. The apparatus for separating and recovering a halide gas according to claim 8, wherein the gas concentration detector and the gas flow control valve are coupled by a controller into a configuration such that the gas flow control valve is controlled based on a measured value of the gas concentration detector so as to adjust the amount of the gas collected from the non-permeate gas outlet.

10. The apparatus for separating and recovering a halide gas according to claim 7, wherein each of the separation membrane modules is configured to be maintained at a constant temperature in a range of from 40 to 200° C. by a heating unit.

11. The apparatus for separating and recovering a halide gas according to claim 7, wherein the at least first and second stage separation membrane modules comprise at least first, second and third stage separation membrane modules, wherein at least said third stage separation membrane module has a gas inlet thereof connected to a permeate gas outlet of an immediately preceding separation membrane module and a non-permeate gas outlet thereof connected to the source of the halide gas-containing mixed gas.

12. The apparatus for separating and recovering a halide gas according to claim 7, wherein each of the separation membrane modules comprises an aromatic polyimide hollow fiber separation membrane.

13. The apparatus for separating and recovering a halide gas according to claim 7, wherein each of the separation membrane modules comprises a carbonized separation membrane obtained by carbonizing a polymer.

14. The apparatus for separating and recovering a halide gas according to claim 13, wherein the carbonized separation membrane is a partially carbonized hollow fiber separation membrane obtained by partially carbonizing an aromatic polyimide asymmetric hollow fiber membrane.

15. The apparatus for separating and recovering a halide gas according to claim 7, wherein the mixed gas of the mixed gas source is an electrically insulating gas containing a halide gas and a diluting gas.

16. The apparatus for separating and recovering a halide gas according to claim 7, wherein the halide gas is $SF_6$ gas.

17. The apparatus for separating and recovering a halide gas according to claim 7, wherein the mixed gas of the mixed gas-source has a halide gas concentration of 3 to 60% by volume.

* * * * *